United States Patent Office 3,137,759
Patented June 16, 1964

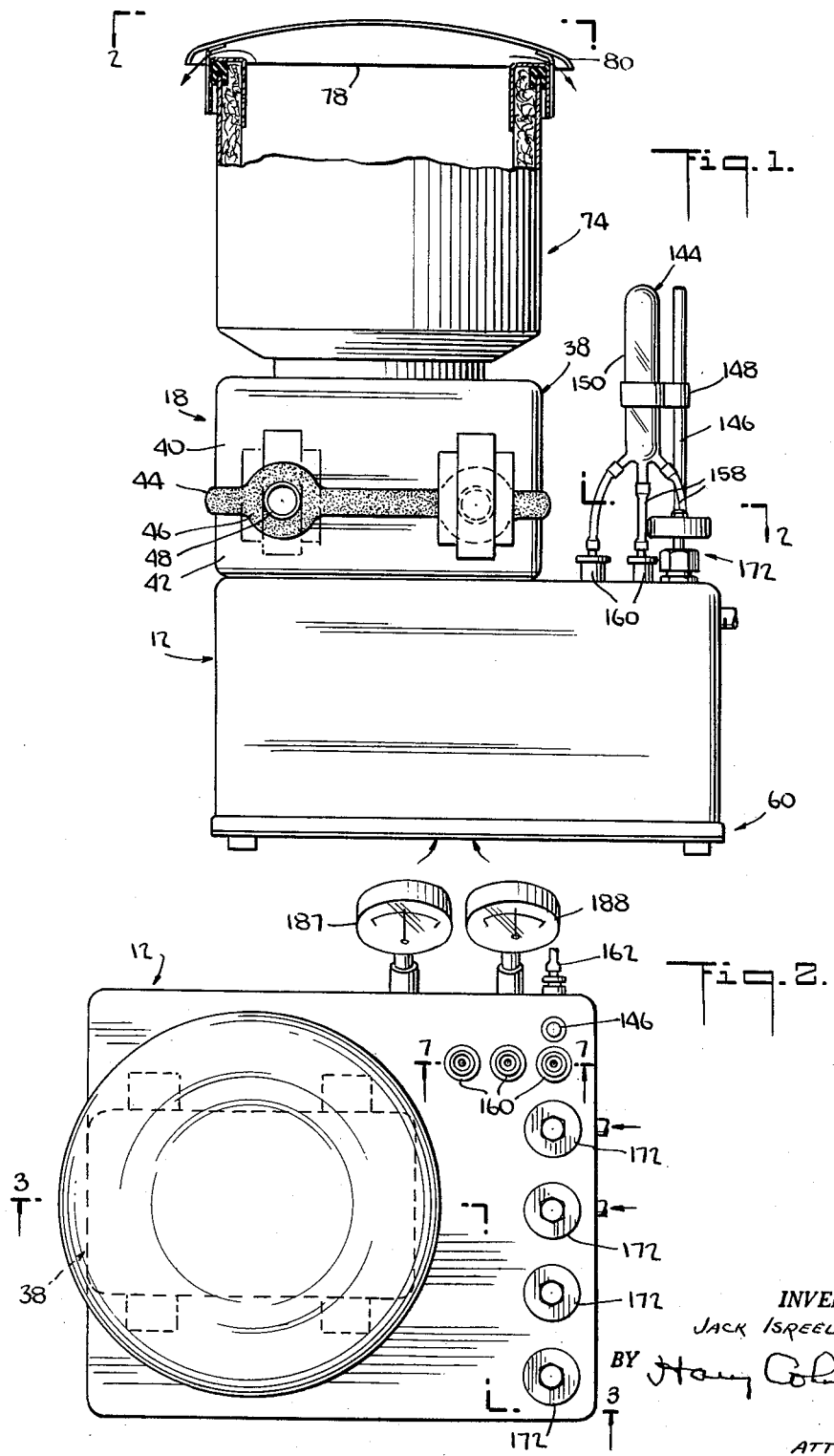

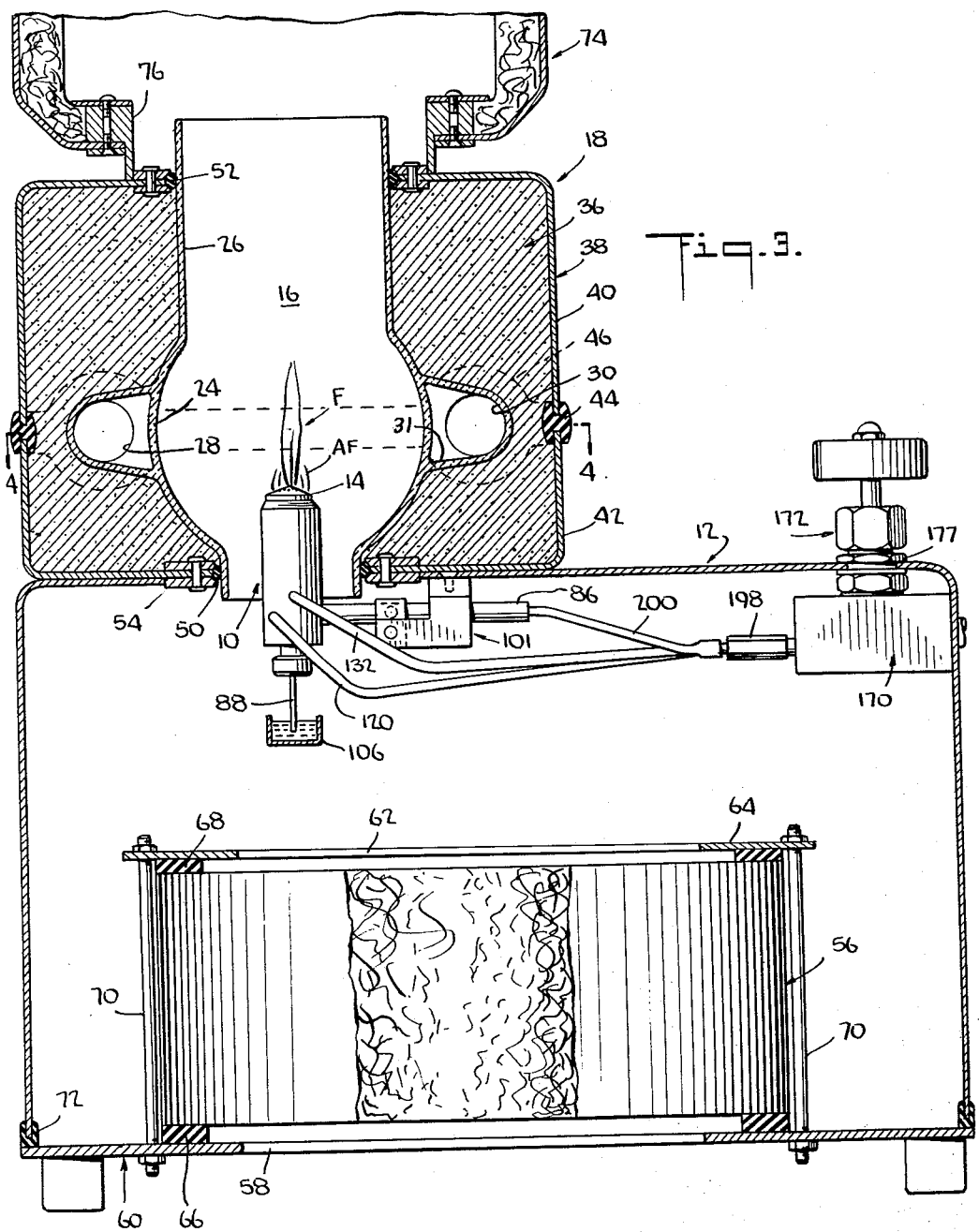

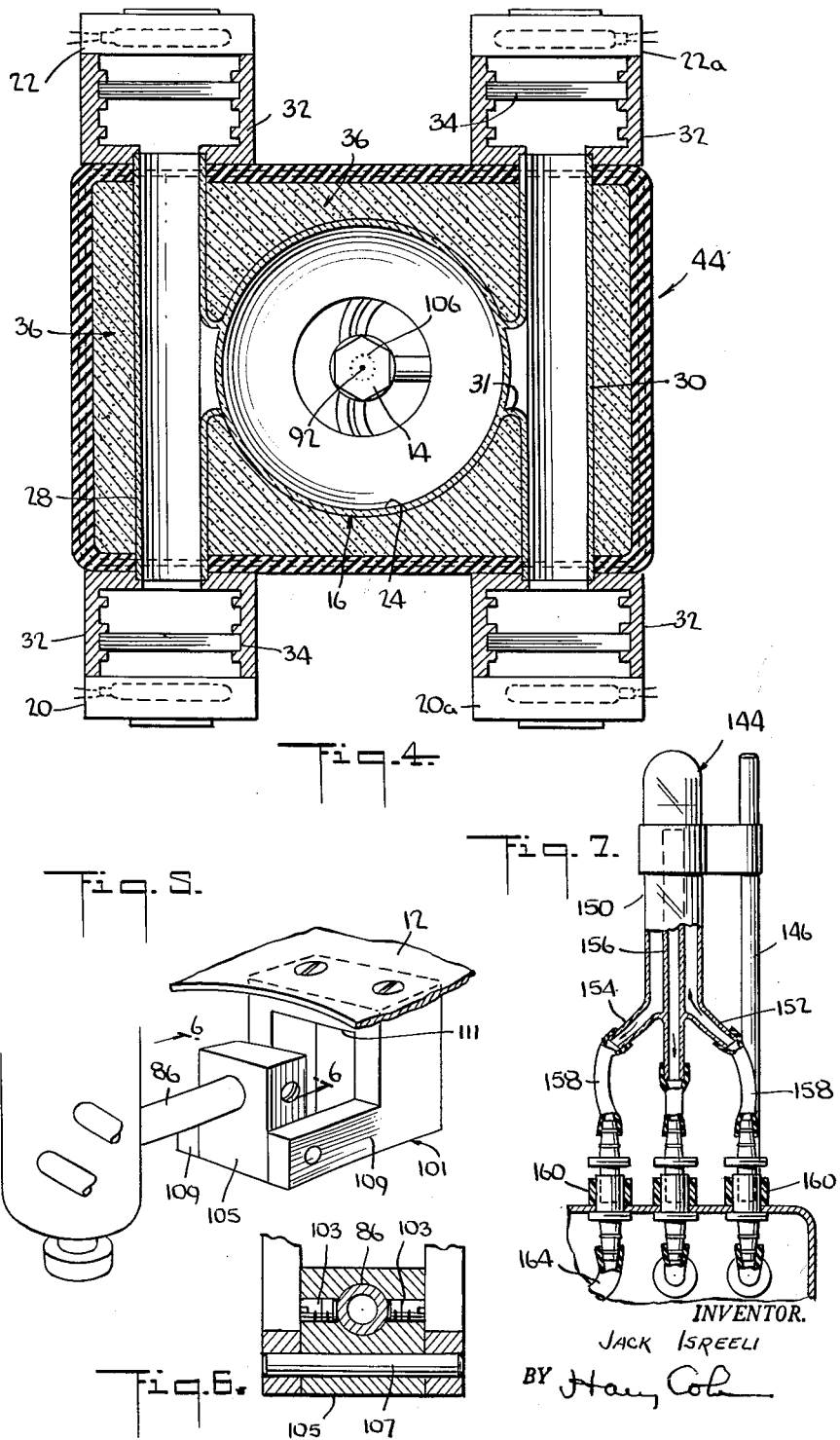

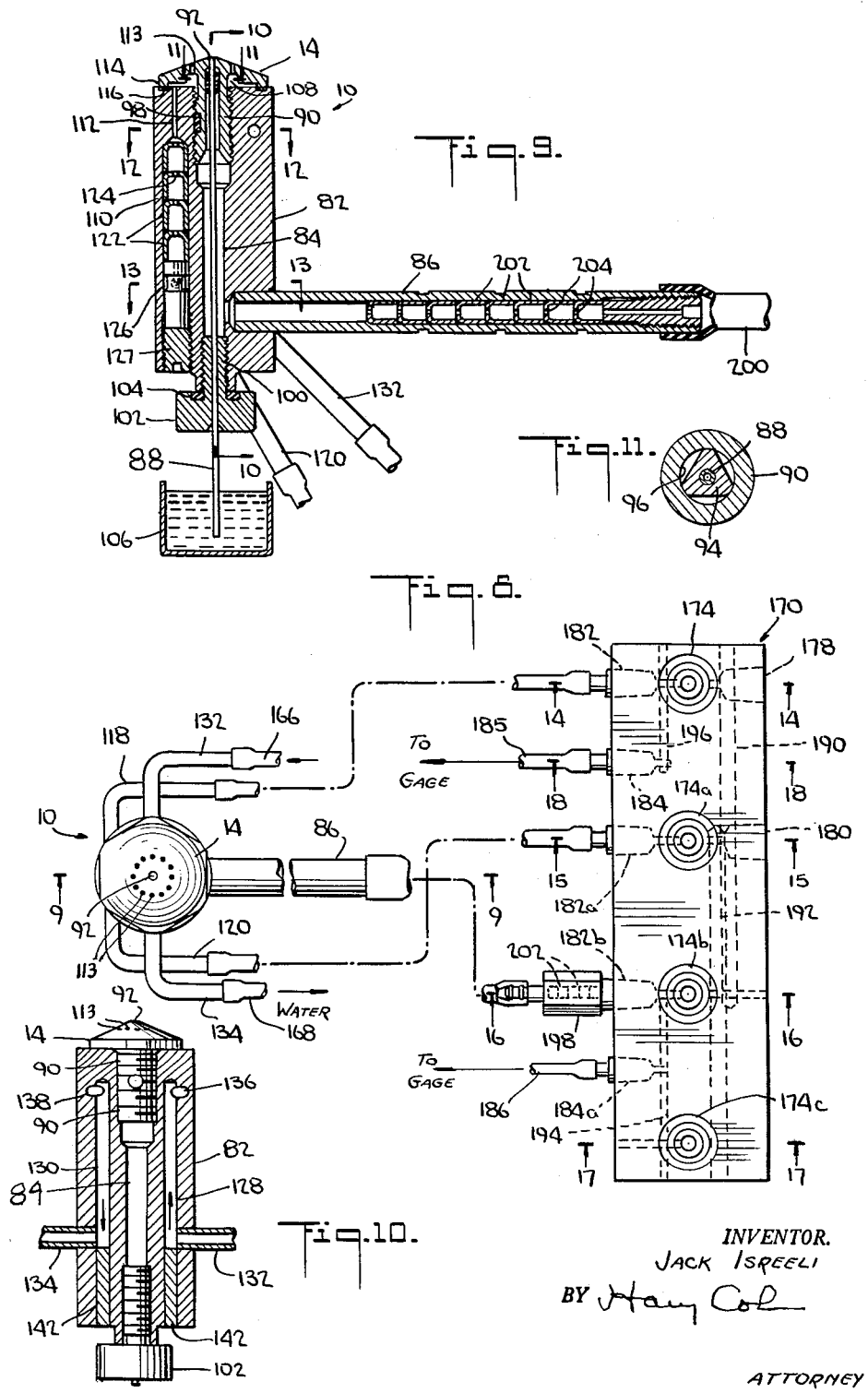

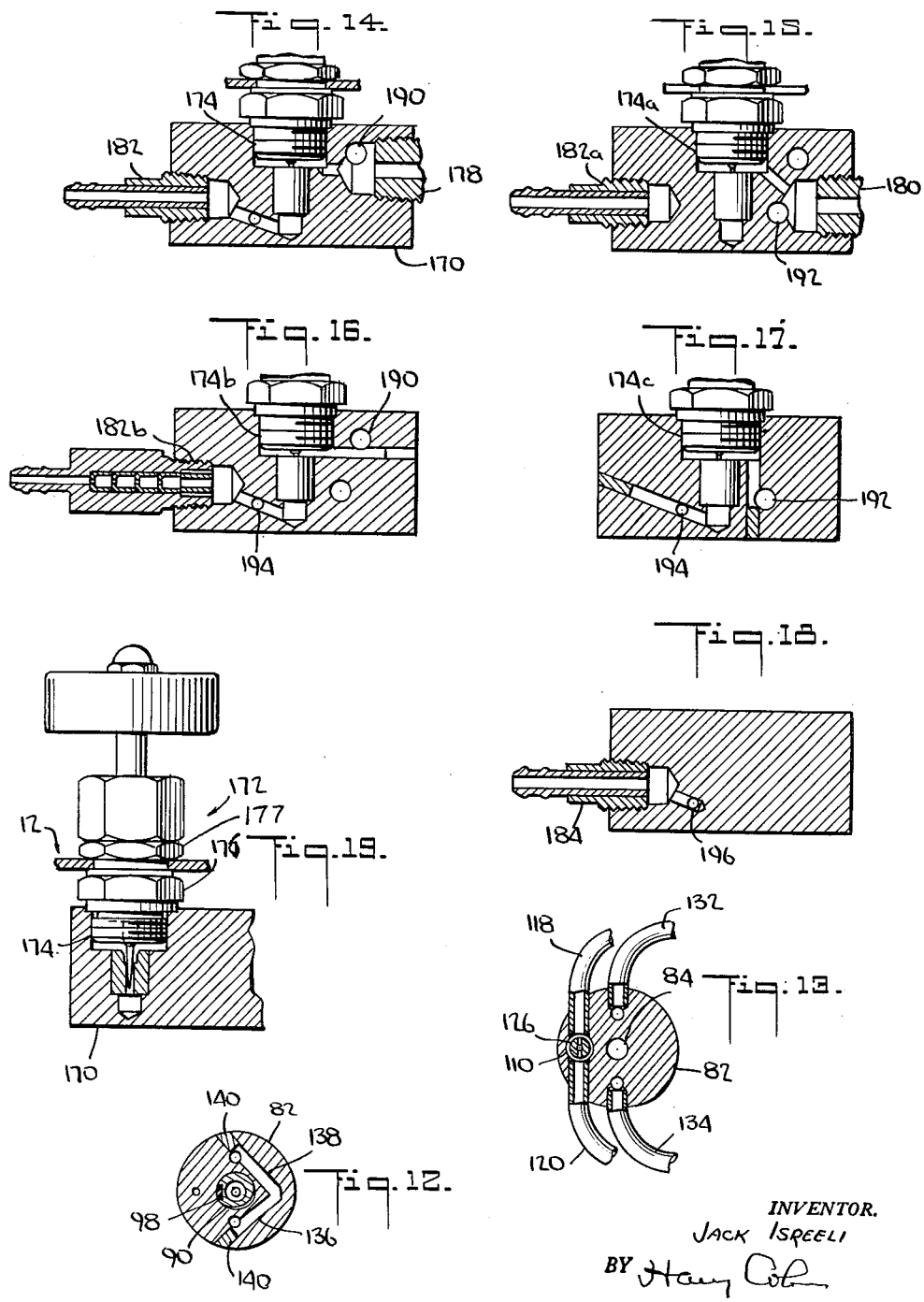

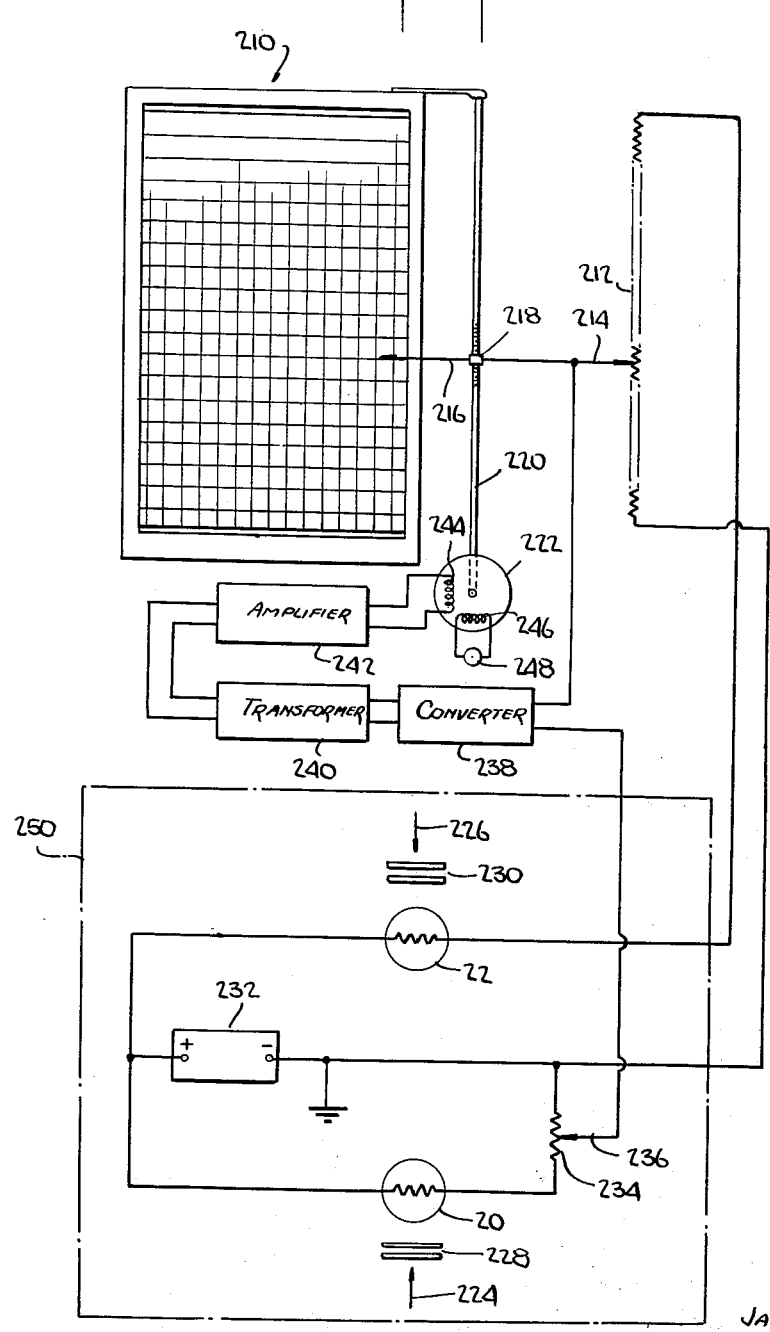

3,137,759
SPECTRAL-FLAME BURNER APPARATUS AND
SPECTRAL-FLAME BURNERS THEREFOR
Jack Isreeli, Tuckahoe, N.Y., assignor to Technicon Instruments Corporation, Chauncey, N.Y., a corporation of New York
Filed Sept. 1, 1959, Ser. No. 837,401
8 Claims. (Cl. 88—14)

This invention relates to spectral-flame burner apparatus and to spectral-flame burners therefor.

The apparatus of this invention may be used for the quantitative analysis of various liquids in respect to one or more substances therein, for example, the analysis of blood serum for sodium or potassium or for both of said substances. In such analysis, lithium is added to the sample of blood serum to provide the sample with an internal standard or reference. When the sample containing the lithium is introduced into the flame of the burner, a quantitative determination of the sodium, for example, is obtained by transmitting the light to photosensitive devices responsive only to the lithium spectral light, in the case of the reference photosensitive device, and only to the sodium spectral light in the case of the sample photosensitive device, and comparing the responses of the two photosensitive devices.

It is important that as much light as possible be transmitted from the spectral flame to the reference and sample photosensitive devices and that the amount of light to which the sample photosensitive device is subjected be equal to the amount of light to which the reference photosensitive device is subjected. Therefore, one of the objects of this invention is the provision of means for transmitting comparatively large and equal amounts of light from the spectral flame to both of the photosensitive devices.

The above and other objects, features and advantages of the invention will be fully understood from the following description considered in connection with the accompanying illustrative drawings.

In the drawings:

FIG. 1 is a side view of the spectral-flame burner apparatus embodying the present invention;

FIG. 2 is a top plan and partly sectional view on the line 2—2 of FIG. 1;

FIG. 3 is a vertical sectional view, on a larger scale, on the line 3—3 of FIG. 2;

FIG. 4 is a horizontal sectional view on the line 4—4 of FIG. 3;

FIG. 5 is a perspective view of the burner support and part of the burner;

FIG. 6 is a sectional view on the line 6—6 of FIG. 5;

FIG. 7 is a sectional view on the line 7—7 of FIG. 2, showing the device for supplying cooling water to the burner;

FIG. 8 is a top plan view of the spectral flame burner and of the fluid distribution means associated therewith;

FIG. 9 is a vertical sectional view of the burner on the line 9—9 of FIG. 8;

FIG. 10 is a vertical sectional view of the burner on the line 10—10 of FIG. 9;

FIG. 11 is a sectional view, on a large scale, on the line 11—11 of FIG. 9;

FIGS. 12 and 13 are sectional views on the lines 12—12 and 13—13, respectively, of FIG. 9;

FIGS. 14 to 18 are sectional views on the lines 14—14, 15—15, 16—16, 17—17 and 18—18, respectively, of FIG. 8;

FIG. 19 is a view partly in elevation and partly in section of one of the valves in the fluid distribution system of the burner; and FIG. 20 is a circuit diagram and schematic view of parts of the apparatus.

Referring now to the drawings in detail, the apparatus of the present invention comprises a spectral-flame burner 10 (FIG. 3) mounted in a housing 12 and positioned so that the burner tip 14 is positioned within the chimney 16. Said chimney also forms part of the means 18 provided in accordance with one of the objects of the invention for obtaining optimum light transmission from the spectral flame to the sample photosensitive devices 20 and 20a and the companion reference devices 22 and 22a, respectively (FIG. 4).

Chimney 16 is made of heat-resistant transparent glass and comprises the spherical or globular part 24 and the upwardly extending cylindrical part 26. As best shown in FIG. 4, tubular parts 28 and 30 are integral with part 24 and are disposed laterally outwardly of part 24 at opposite sides, respectively, thereof, forming light passages which extend between the companion photosensitive devices 20, 22 and 20a, 22a, respectively. Transparent light transmitting passage means 31 transversely intersect tubes 28 and 30 and interconnect the latter with globular part 24 at opposite sides of the globular part. The provision of the two light-passage tubes 28 and 30 is preferred as it enables the reference photosensitive devices 22 and 22a and the companion sample devices 20 and 20a to be kept in position in readiness for analysis of a liquid in respect to either or both of two substances therein, for example, the analysis of blood serum in respect to sodium or potassium or both. In this connection it will be observed that the photosensitive devices have light filter mounts 32 associated therewith, respectively, for light filters 34 which pass only the light of the required spectral line, namely for lithium in the case of devices 22 and 22a, for sodium in the case of device 20, and for potassium in the case of device 20a. It will be understood, however, that the light transmission device may be provided with only one tubular part 28 or 30 and that the light filter may be changed as needed for analysis of the liquid under investigation.

In accordance with the invention, provision is made for transmitting a comparatively large amount of light from the spectral flame to the companion photosensitive devices and in such a way that each device of the pair receives the same quantity of light. For this purpose the chimney device 16 and the integral tubular parts 28 and 30 are surrounded by a mass 36 of light-reflective material in the casing 38. The light-reflective material 36 consists of finely divided magnesium oxide powder which possesses excellent light-reflective properties. Casing 38 is formed in two parts 40 and 42 which are connected to each other by the rubber gasket 44 which extends completely around the casing. Said gasket is provided with parts 46 which have openings 48 in which the ends of tubular parts 28 and 30 of the chimney and light transmission device 16 extend in sealed relation thereto. Casing 38 is also provided with lower and upper openings provided with the gaskets 50 and 52 which engage the lower and upper cylindrical ends of chimney 16 in sealing relation thereto. It will be understood that gaskets 44, 50 and 52 prevent the escape of the light reflecting powder 36 from the casing 38.

Referring to FIGS. 3 and 4, it will be noted that the globular part 24 of the chimney 16 surrounds the burner flame so that the light thereof is reflected by the magnesium oxide powder laterally into the tubular parts 28 and 30 for passage to the photosensitive devices. Also it is to be noted that the light which enters the tubular parts 28 and 30 directly from the flame and by reflection travels under the same conditions to the opposite ends of said parts 28 and 30, respectively, so that the same quantity of light is operable on the companion photosensitive devices. Thus, the light of the flame is effectively integrated or gathered, due to the provision of the magnesium oxide powder in conjunction with the chimney device 16 and the tubular parts 28 and 30, and is transmitted under the same conditions to the companion photosensitive devices.

As illustrated in FIG. 3, the casing 38 of the light transmission means 18 is supported by the housing 12 and the top of said housing is provided with an opening 54 through which the lower end of chimney 16 extends. An air filter 56 is positioned at the bottom of housing 12 in registry with the air inlet opening 58 in the housing base 60, and with an opening 62 in the clamping plate 64. Gaskets 66 and 68 are provided between the filter and the base 60 and the clamping plate 64, and clamping bolts 70 hold the parts together in fluid-tight relation. The bottom edge of the housing 12 is removably secured to the base 60 in fluid-tight relation thereto by the gasket 72. A sound muffler 74 (FIGS. 1 and 3) is removably seated on the top of casing 38 and has a lower opening 76 into which the upper end of chimney 16 extends. The muffler has a top opening 78 and a deflector plate 80 mounted thereon. When the burner 10 is ignited, the heat of the flame induces a flow of air upwardly through filter 56 and through chimney 16 to cool the chimney and aid in sweeping the products of combustion upwardly through the chimney and the muffler 74.

The spectral-flame burner 10 will now be further described. Referring first to FIGS. 8 to 13, said burner comprises a main body part 82 which has a central bore 84 which provides a passage for the gaseous fuel. A rigid tube 86 is secured to body part 82 and communicates with said fuel passage near the lower end thereof. A tube 88 of small diameter extends through bore 84 centrally thereof for introducing the blood serum or other liquid to be analyzed into the burner flame. The upper end of tube 88 passes through the shank 90 of the burner tip and terminates at the opening 92 through which the gaseous fuel passes. Said tube 88 is centered in said opening 92 by the triangular plug 94 in which tube 88 has a tight fit and which is closely fitted in the bore 96 of the shank 90 of the cap 14. Shank 90 is screwed into the upper end of body part 82 and a small nylon plug 98 is positioned between the threaded shank and the threaded bore to prevent leakage of fuel gas between said shank and bore. The lower end of bore 84 is closed by the threaded plug 100 through which tube 88 passes with a fluid-tight fit. The head 102 of plug 100 is provided with a polytetrafluoroethylene gasket 104 which engages the lower end of body part 82.

Burner 10 is mounted on a bracket 101 which is secured to the top of the housing 12 internally thereof (FIGS. 3 and 6). Provision is made in the mount for the burner to enable it to be pivotally moved clockwise, viewing FIG. 3, through the opening 54 of said housing to a position externally thereof, when the chimney and light transmission casing are removed, for access to the burner, especially to the sample tube 88 in the event that said tube becomes clogged and needs to be cleaned. For this purpose, as shown by FIGS. 5 and 6, the inlet tube 86 is secured by set screws 103 to the block 105 which is pivotally mounted on bracket 101 by pivot pin 107 between the arms 109 of the bracket. In the normal vertical position of the burner, movement therefrom in a counter-clockwise direction is prevented by engagement of tube 86 with the underside of the top 111 of the bracket.

In the burner 10 as thus far described the flow of the gaseous fuel through opening 92 aspirates the blood serum or other liquid from the supply receptacle indicated at 106 in FIG. 9 and thereby introduces the liquid into the flame. In order thus to aspirate the liquid, the velocity of the fuel at the opening 92 must be relatively high. But when the fuel gas is composed of a combustible mixture of certain gases such as a mixture of propane and oxygen or cyanogen and oxygen which have been found to provide an excellent flame for spectral analysis, the rate of flame propagation is low in comparison with the velocity of the fuel necessary for aspirating the sample liquid through tube 88, with the result that the flame becomes extinguished. In order to overcome this difficulty, the burner is provided with means to form an auxiliary flame which extends around and close to the opening 92 for the fuel gas for the main flame and prevents the main flame from being extinguished.

The means for providing the auxiliary flame comprises a circular row of openings 113 in the cap 14 which has an inner recess 108 (FIG. 9) which communicates with the bore 110 of the body part 82 through the bore 112. The peripheral edge 114 of the cap which surrounds the recess 108 engages a polytetrafluoroethylene gasket 116 on body part 82 to provide a fluid tight joint. Propane and oxygen are supplied by tubes 118 and 120, respectively (FIGS. 8 and 13), to the lower end of bore 110 to form a combustible mixture for the auxiliary flame. In order to thoroughly mix the propane and oxygen before the gases reach the outlet bore 112 a series of inverted cup-shaped members 122 having apertures 124 therein are disposed in bore 110 between inlet 126 and outlet bore 112. In the course of the passage of the propane and oxygen through these cup-shaped members, these gases are thoroughly intermixed and the fuel gas mixture thus formed is highly effective to provide the auxiliary flame at the openings 113 around the main flame. The lower end of bore 110 is closed by the screw plug 127.

Provision is made for cooling the burner 10. For this purpose, body part 82 is provided with the water passages 128 and 130 (FIG. 10) to which the water inlet and outlet tubes 132 and 134, respectively, are connected. The upper end of water passage 128 is connected to the upper end of water passage 130 by the cross bores 136 and 138 (FIGS. 10 and 12), the outer ends of said bores being closed by the plugs 140. The lower ends of passages 128 and 130 are closed by plugs 142. Water is supplied to the inlet tube 132 at constant pressure by the constant water head device 144 (FIGS. 1 and 7) mounted on the base housing 12 by the post 146 and the bracket 148. Said constant head device comprises the chamber 150 which is preferably made of glass and is transparent. Said chamber is provided with an inlet 152, an outlet 154 and an overflow tube 156 which terminates at its upper end below the top of chamber 150. By adjusting the water faucet (not shown) of a conventional water supply pipe the level of the water in chamber 150 can be kept constant irrespective of water pressure variations which might otherwise occur due to relatively small changes in faucet adjustments. Flexible tubes 158 and fittings 160 are provided for connecting the chamber 150 to the water supply pipe 162 (FIG. 2) for connecting the outlet 154 to the tube 164 which is connected to the water inlet tube 132 of the burner by flexible tube 166 (FIG. 8). The water outlet tube 134 of the burner may be connected by flexible tube 168 to waste in any suitable way.

The fuel gas distribution system of the apparatus comprises a valve block 170 which is secured to the top internally thereof (FIGS. 3, 8 and 14 to 19). Needle valves 172 are threaded into companion tapped openings 174 in the valve block, as shown by FIG. 19 and a nut 176 on the valve body is engaged with the top of the housing to secure the valve block 170 against the inner side of the top of the housing. The valve block is provided with a plurality of fluid passages which are controlled by companion valves 172. In FIG. 8 the openings for the valves are indicated at 174, 174a, 174b and 174c. The inlet for propane or other fuel gas is indicated at 178, and the oxygen inlet is indicated at 180. The gas outlets are indicated at 182, 182a and 182b. Openings 184 and 184a are provided for gas pressure gage fittings, the gages which are connected to said fittings by flexible tubes 185 and 186 being indicated at 187 and 188 in FIG. 2. A passage 190 which communicates with the propane inlet 178 extends to the valve controlled opening 174b which communicates with outlet 182b for supplying propane to the main flame. The propane for the auxiliary flame is supplied from inlet 178 through valved opening 174 to outlet 182. A passage 192 which communicates with the oxygen inlet 180 communicates with the valve controlled opening 174c and the outlet side of said opening is connected by a passage 194 to the outlet 182b. The oxygen for the auxiliary flame passes directly from the inlet 180 through the valve controlled opening. A passage 196 communicates with the outlet side of the valve controlled opening 174 and is connected to the opening 184 for communicating the pressure of the gas mixture for the auxiliary flame to the gage, while the opening 184a for the pressure gage for the main flame gas mixture communicates with passage 194. It will be understood that the needle valves 172 provide for fine adjustment of the pressures at which the propane or other fuel gas and the oxygen are supplied for the main and auxiliary flames of the burner.

A highly desirable feature of the burner apparatus of this invention is the provision for supplying a combustible gaseous mixture to the burner tip for both the main and the auxiliary flames, as distinguished from mixing the fuel gas and the oxygen or other supporter of combustion at or near the burner tip. The thorough pre-mixing of the propane and oxygen for the auxiliary flame has been described above with reference to the mixing elements 122 in the bore 110 of the burner (FIG. 9). In the case of the gases for the main flame, the propane and oxygen which flow together through the common outlet 182b flow through a mixer 198 which is threaded into said outlet and is connected by a flexible tube 200 (FIGS. 3, 8 and 9) to the inlet tube 86 of the burner. A series of mixing cups 202, apertured as indicated at 204 are disposed in tube 86 and a series of such cups are also provided in the pre-mixer 198. Thus the propane and oxygen are thoroughly mixed to provide the combustible gas mixture for the main flame. It is within the scope of the invention to omit the pre-mixer 198, especially when the pre-mixer formed by the mixer elements 204 in tube 202 are sufficient in number or otherwise adequate to thoroughly mix the gases. However, by providing the pre-mixer 198, the tube 86 can be shorter than would be the case if mixer 198 were omitted.

As a result of thoroughly pre-mixing the fuel gas and combustion supporting gas, the burner operates with a steady, thin, bright and intense flame which is desirable for a spectral flame. Also, the pre-mixing of the gases both for the main flame and the auxiliary flame and the provision of the auxiliary flame co-act to sustain the main flame and thus make possible the supply of the combustible gaseous mixture to the main flame at a sufficiently high velocity to aspirate the sample liquid through the tube 88. It will be noted that the flow of gases for the auxiliary flame is controlled by the valves in the openings 174 and 174a separately from the control of the flow of gases for the main flame through the valve controlled openings 174b and 174c. Since the gas flow for the auxiliary flame does not participate in the aspiration of the liquid sample into the main or spectral flame, the flow can be at a relatively low velocity so that there is no danger of exceeding the rate of flame propagation. In the operation of the burner, the main flame indicated at F in FIG. 3 is longer than the auxiliary flame indicated at AF, and the spectral color part of the main flame is above the auxiliary flame for transmission to the photosensitive devices as above described.

It will be understood that while the burner 10 has been described as operating with aspiration of the sample liquid by the flow of the main flame gas mixture past the upper end of tube 88, the invention is not limited to such operation and instead of aspirating the liquid sample through tube 88 the liquid sample under investigation can be pumped by a separate pump (not shown) through said tube, as will be readily understood.

FIG. 20 is a schematic view and circuit diagram to illustrate the operation of a recorder 210 which is of the well known self-balancing slide wire type, the slide wire potentiometer being indicated at 212, the movable tap at 214 and the recorder stylus which is moved in unison with said tap being indicated at 216. Tap 214 and stylus 216 are connected to the nut 218 which is moved longitudinally of threaded rotary rod 220 of the two phase motor 222. It will be understood that nut 218 is held against rotation and that rod 220 is held against longitudinal movement so that when it is rotated by motor 222 the nut 218 is moved longitudinally for the balancing operation of tap 214 and for the concomitant movement of stylus 216. The companion sample and reference photosensitive devices are indicated at 20 and 22, and they are preferably cadmium-sulfide photoconductive cells which are well known. The arrows 224 and 226 indicate the light from the spectral flame which passes through the filters 228 and 230 for acting on the cells 20 and 22 respectively. As previously indicated only light of the spectral line of sodium passes through the filters 228 to sample cell 20, and only light of the spectral line of lithium, employed as the internal standard passes through the filters 230 to the reference cell 22. A regulated power supply is indicated at 232 and a load resistance is indicated at 234 and is provided with an adjustable tap 236. The taps 214 and 236 are connected to the D.C.–A.C. converter 238, the output of which is connected to the transformer 240. The output of the transformer is amplified by the amplifier 242 and supplied to the winding 244 of the two-phase motor 222, the other winding 246 of said motor being energized by the A.C. source indicated at 248. The self-balancing recorder system which includes the slide wire 212, motor 222, converter 238, transformer 240 and amplifier 242 is conventional. The circuitry within the box outline 250 is not per se part of my invention, but was developed by Milton H. Pelavin who is the inventor thereof and the assignor of all patents rights to the assignee of this application. It will be understood however that it is within the scope of this invention to employ any suitable circuitry, in accordance with known practice, for operating the recorder 210 under the control of sample and reference photosensitive devices, and that while the photoconductive cells are preferred for use as the photosensitive device, it is within the scope of this invention to employ other types of photosensitive devices in lieu of said photoconductive tubes for controlling the operation of the recorder.

With further reference to the light-reflecting means which comprises the magnesium oxide powder, it is to be noted that by reason of the crystalline character of this powder the light from the flame is reflected in a multiplicity of directions in a mixed pattern so that even if the flame is not uniform it is nevertheless reflected as a uniform flame to the photosensitive devices. In other words, the magnesium oxide powder may be considered as a mixer of the light components of the flame so as to present a homogeneous light beam to the photosensitive devices. Also, it will be understood that the apparatus of this invention provides a spectral-flame burner which is unaffected by cigarette or other tobacco smoke or by dust or other particles in the laboratory, and that external light is excluded by the casing 38 and the downwardly extending rim of the muffler plate 80.

It is to be noted further that the pre-mixing of the fuel gas and oxygen is highly advantageous especially because this contributes to a considerable extent to the steadiness of the flame.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What I claim is:

1. Spectral-flame burner apparatus, comprising a spectral-flame burner having a burner tip and gas passage means in communication with said tip to provide a spectral-flame at said burner tip, reference and sample photosensitive devices, and means for simultaneously transmitting light from said spectral-flame to said photosensitive devices, said light transmitting means comprising a chamber containing light-reflecting powder and having a transparent inner wall forming a globular hollow part, said burner tip being positioned within said globular hollow part for transmission of the light from said spectral-flame through said inner wall to said light-reflecting powder for reflection by the latter, a tubular transparent part positioned within said chamber and laterally outwardly of said inner wall forming said globular hollow part, said photosensitive devices being positioned along the length of said tubular part, and light transmitting means transversely intersecting said tubular part and interconnecting said globular part and said tubular part, whereby light is transmitted from said spectral-flame to said photosensitive devices by reflection from said powder.

2. Spectral-flame burner apparatus, comprising a spectral-flame burner having a burner tip and gas passage means in communication with said tip to provide a spectral-flame at said burner tip, reference and sample photosensitive devices, and means for simultaneously transmitting light from said spectral-flame to said photosensitive devices, said light transmitting means comprising a chamber containing light-reflecting powder and having a transparent inner wall forming a globular hollow part, said burner tip being positioned within said globular hollow part for transmission of the light from said spectral-flame through said inner wall to said light-reflecting powder for reflection by the latter, a tubular transparent part positioned within said chamber and laterally outwardly of said inner wall forming said globular hollow part, said photosensitive devices being positioned along the length of said tubular part, and light transmitting means transversely intersecting said tubular part and interconnecting said globular part and said tubular part, whereby light is transmitted from said spectral-flame to said photosensitive devices by reflection from said powder, said globular part being open at its opposite ends for the passage of air and products of combustion therethrough, and said inner wall having a tubular part extending upwardly from said globular part, and a longitudinally extending sound muffler in communication with said last mentioned tubular part and extending upwardly therefrom.

3. Spectral-flame burner apparatus, comprising a spectral-flame burner having a burner tip and gas passage means in communication with said tip to provide a spectral-flame at said burner tip, reference and sample photosensitive devices, and means for simultaneously transmitting light from said spectral-flame to said photosensitive devices, said light transmitting means comprising a chamber containing magnesium oxide powder and having a transparent inner wall forming a globular hollow part, said burner tip being positioned within said globular hollow part for transmission of the light from said spectral-flame through said inner wall to said magnesium oxide powder for reflection by the latter, a tubular transparent part positioned within said chamber and laterally outwardly of said inner wall forming said globular hollow part, said photosensitive devices being positioned along the length of said tubular part, and light transmitting means transversely intersecting said tubular part and interconnecting said globular part and said tubular part, whereby light is transmitted from said spectral-flame to said photosensitive devices by reflection from said powder.

4. Spectral-flame burner apparatus, comprising a spectral-flame burner having a burner tip and gas passage means in communication with said tip to provide a spectral-flame at said burner tip, means for reflecting the light from said flame comprising a transparent chimney within which said burner tip is positioned and a casing positioned around said chimney and having light-reflecting powder therein around said chimney, said casing having vertically spaced openings in which vertically spaced parts of said chimney are positioned, gasket means secured to said casing at said openings, respectively, and engaging said parts of said chimney for preventing the escape of the light-reflecting powder through said openings, a transparent tubular member positioned in said casing and said light-reflecting powder laterally outwardly of said chimney for holding reference and sample photosensitive devices, and light transmitting means transversely intersecting said tubular member and interconnecting said chimney and tubular member, whereby light is transmitted from said spectral-flame to said photosensitive devices by reflection from said powder.

5. Spectral-flame burner apparatus, comprising a spectral-flame burner having a burner tip and gas passage means in communication with said tip to provide a spectral-flame at said burner tip, means for reflecting the light from said flame comprising a transparent chimney within which said burner tip is positioned and a casing positioned around said chimney and having light-reflecting powder therein around said chimney, said casing having vertically spaced openings in which vertically spaced parts of said chimney are positioned, gasket means secured to said casing at said openings, respectively, and engaging said parts of said chimney for preventing the escape of the light-reflecting powder through said openings, a transparent tubular member positioned in said casing and said light-reflecting powder laterally outwardly of said chimney, reference and sample photosensitive devices positioned in said tubular member, and light transmitting means transversely intersecting said tubular member and interconnecting said chimney and said tubular member, whereby light is transmitted from said spectral-flame to said photosensitive devices by reflection from said powder.

6. Spectral-flame burner apparatus, comprising a spectral-flame burner having a burner tip and gas passage means in communication with said tip to provide a spectral-flame at said burner tip, reference and sample photosensitive devices, and means for transmitting light from said spectral-flame to said photosensitive devices comprising a chimney having a transparent hollow globular part within which said burner tip is positioned for transmission of light from said spectral-flame through said globular part, a casing extending around said globular part and having light-reflecting powder therein extending around said globular part, said casing having vertically spaced openings in which vertically spaced parts of the chimney at opposite ends of said globular part are positioned, a transparent tubular part positioned in said casing and said light-reflecting powder laterally outwardly of said globular part, said casing having horizontally spaced openings in which horizontally spaced portions of said tubular part are positioned, gasket means secured to said casing at said vertically spaced openings and engaging said vertically spaced parts of said chimney, said casing comprising two vertically disposed sections disposed in edge-to-edge relation with a horizontal joint therebetween, second gasket means secured to said casing at said horizontally spaced openings and engaging the horizontally spaced portions of said tubular part positioned in said horizontally spaced openings, third gasket means in fixed relation to said second gasket means and extending peripherally of said casing for sealing the joint between said casing sections, said photosensitive devices being positioned in said tubular part, and light transmitting means transversely intersecting said tubular member and interconnecting said tubular part and said globular part, whereby light is transmitted from said spectral-flame to said photosensitive devices by reflection from said powder.

7. Spectral-flame burner apparatus, comprising a spectral-flame burner having a burner tip and gas passage means in communication with said tip to provide a spectral-flame at said burner tip, means for reflecting the light from said flame comprising a transparent chimney within which said burner tip is positioned and a casing positioned around said chimney and having light-reflecting powder therein around said chimney, said casing having vertically spaced openings in which vertically spaced parts of said chimney are positioned, gasket means secured to said casing at said openings, respectively, and engaging said parts of said chimney for preventing the escape of the light-reflecting powder through said openings, a transparent tubular member positioned in said casing and said light-reflecting powder laterally outwardly of said chimney, reference and sample photosensitive devices positioned in said tubular member, and spaced apart from each other longitudinally of said tubular member, and light transmitting means transversely intersecting said tubular member and interconnecting said chimney and said tubular member, whereby light is transmitted from said spectral-flame to said photosensitive devices by reflection from said powder, said photosensitive devices being positioned at opposite sides of said light transmitting means.

8. Spectral-flame burner apparatus, comprising a spectral-flame burner having a burner tip and gas passage means in communication with said tip to provide a spectral-flame at said burner tip, means for reflecting the light from said flame comprising a transparent chimney within which said burner tip is positioned and a casing positioned around said chimney and having light-reflecting powder therein around said chimney, said casing having vertically spaced openings in which vertically spaced parts of said chimney are positioned, gasket means secured to said casing at said openings, respectively, and engaging said parts of said chimney for preventing the escape of the light-reflecting powder through said openings, a transparent tubular member positioned in said casing and said light-reflecting powder laterally outwardly of said chimney for holding reference and sample photosensitive devices, light transmitting means transversely intersecting said tubular member and interconnecting said chimney and tubular member, whereby light is transmitted from said spectral-flame to said photosensitive devices by reflection from said powder, a rigid inlet tube fixed to said burner and in fluid flow communication with said gas passage means, a housing connected to said casing and having an opening through which said burner tip extends with the lower part of the burner and said inlet tube disposed within said housing, and means within said housing releasably engageable with said inlet tube for supporting the burner in said position.

References Cited in the file of this patent
UNITED STATES PATENTS

| | | |
|---|---|---|
| 2,058,522 | Smyly | Oct. 27, 1936 |
| 2,218,357 | Pineo | Oct. 15, 1940 |
| 2,562,874 | Weichselbaum | July 31, 1951 |
| 2,664,779 | White | Jan. 5, 1954 |
| 2,769,366 | Honma | Nov. 6, 1956 |
| 2,805,598 | Spraque et al. | Sept. 10, 1957 |
| 2,833,371 | Honma | May 6, 1958 |
| 2,857,801 | Murray | Oct. 28, 1958 |
| 2,858,729 | Keyes | Nov. 4, 1958 |

OTHER REFERENCES

Moon et al.: Some Tests on Radiation Mixing Exclosures, Journal of the Optical Society of America, vol. 29, No. 1, January 1939, pages 20–25.